(12) United States Patent
Iyengar et al.

(10) Patent No.: US 8,096,479 B2
(45) Date of Patent: Jan. 17, 2012

(54) MULTIFUNCTIONAL PAPER IDENTIFICATION LABEL

(75) Inventors: Gopal Iyengar, Stevens Point, WI (US); Joseph E. Briganti, Plover, WI (US); Robert L. Schade, Wisconsin Rapids, WI (US)

(73) Assignee: NewPage Wisconsin System Inc., Miamisburg, OH (US)

( * ) Notice: Subject to any disclaimer, the term of this patent is extended or adjusted under 35 U.S.C. 154(b) by 155 days.

(21) Appl. No.: 12/307,854

(22) PCT Filed: Feb. 22, 2008

(86) PCT No.: PCT/US2008/054651
§ 371 (c)(1),
(2), (4) Date: Aug. 28, 2009

(87) PCT Pub. No.: WO2008/103870
PCT Pub. Date: Aug. 28, 2008

(65) Prior Publication Data
US 2010/0059597 A1 Mar. 11, 2010

Related U.S. Application Data

(60) Provisional application No. 60/903,107, filed on Feb. 23, 2007.

(51) Int. Cl.
*G06K 19/00* (2006.01)
*G06K 19/06* (2006.01)

(52) U.S. Cl. .................. 235/487; 235/492; 235/494

(58) Field of Classification Search .......... 235/487, 235/492, 494; 438/106; 427/7, 470, 471; 428/32.21, 32.24, 32.25, 32.38
See application file for complete search history.

(56) References Cited

U.S. PATENT DOCUMENTS

| | | | |
|---|---|---|---|
| 5,574,470 A * | 11/1996 | de Vall | 343/895 |
| 5,982,284 A | 11/1999 | Baldwin et al. | |
| 6,018,299 A | 1/2000 | Eberhardt | |
| 6,104,311 A | 8/2000 | Lastinger | |
| 6,206,292 B1 | 3/2001 | Robertz et al. | |
| 6,265,977 B1 | 7/2001 | Vega et al. | |
| 6,281,795 B1 | 8/2001 | Smith et al. | |
| 6,413,370 B1 | 7/2002 | Wurster et al. | |
| 6,437,985 B1 | 8/2002 | Blanc et al. | |

(Continued)

FOREIGN PATENT DOCUMENTS

BR PI04182383 A 4/2007

(Continued)

*Primary Examiner* — Thien M. Le
*Assistant Examiner* — April Taylor
(74) *Attorney, Agent, or Firm* — Greer, Burns & Crain, Ltd.

(57) ABSTRACT

A multifunctional identification label comprises a paper substrate formed from a cellulose furnish including 1 to 2.5 percent of a wet strength resin and a rosin size. A front side of the substrate is machine glazed, coated with a print receptive coating, and printed with a bar code. The back side of the substrate has a coating comprising one or more pigments selected from the group of clay, magadite and mixtures thereof, a binder, and 1 to 2.5 parts by dry weight of pigment of a salt. A conductive ink antenna is printed on the back side coating. A RFID chip is secured to the back side of the coated substrate and electrically connected to the antenna. Embodiments of the invention include a pressure sensitive adhesive label including RFID and bar code identification, a ticket adapted for printing on both sides incorporating RFID identification, and an RFID insert.

15 Claims, 2 Drawing Sheets

U.S. PATENT DOCUMENTS

| | | |
|---|---|---|
| 6,603,400 B1 | 8/2003 | Shoobridge |
| 6,732,923 B2 | 5/2004 | Otto |
| 6,786,419 B2 | 9/2004 | Kayanakis |
| 7,075,435 B2 | 7/2006 | Jesser |
| 7,102,523 B2 | 9/2006 | Shanks et al. |
| 7,439,933 B2 * | 10/2008 | Uesaka ............ 343/895 |
| 2002/0127423 A1 | 9/2002 | Kayanakis |
| 2002/0140557 A1 | 10/2002 | Dukler et al. |
| 2002/0190132 A1 | 12/2002 | Kayanakis |
| 2002/0192856 A1 | 12/2002 | Halope et al. |
| 2003/0153120 A1 | 8/2003 | Halope |
| 2005/0071539 A1 | 3/2005 | Gerbault |
| 2005/0230486 A1 | 10/2005 | Halope |
| 2006/0092026 A1 | 5/2006 | Lawrence et al. |
| 2006/0155881 A1 | 7/2006 | Pangaud |
| 2006/0176181 A1 | 8/2006 | Halope |
| 2006/0181470 A1 | 8/2006 | Pangaud et al. |
| 2006/0181478 A1 | 8/2006 | Benato |
| 2006/0232413 A1 | 10/2006 | Lam et al. |
| 2007/0017988 A1 | 1/2007 | Sureaud et al. |
| 2007/0054100 A1 * | 3/2007 | Tokiyoshi et al. ...... 428/211.1 |
| 2008/0142154 A1 * | 6/2008 | Green et al. ............ 156/264 |

FOREIGN PATENT DOCUMENTS

| | | |
|---|---|---|
| FR | IL144712 A | 9/2005 |
| FR | IL144301 A | 12/2005 |
| HK | 1051590 A1 | 5/2005 |
| HK | 1044859 A1 | 8/2005 |
| HK | 1051591 A1 | 11/2005 |
| HK | 1044399 A1 | 2/2006 |
| HK | 1044418 A1 | 6/2006 |
| HK | 1045580 A1 | 6/2006 |
| HK | 1056793 A1 | 7/2006 |
| HK | 1051935 A1 | 11/2006 |
| HK | 1063232 A1 | 4/2007 |
| HK | 1064482 A1 | 4/2007 |
| KR | 1020050039713 A | 4/2004 |
| KR | 1020050088105 A | 1/2005 |
| KR | 20060002895 A | 1/2006 |
| KR | 1020060023973 A | 3/2006 |
| KR | 1020060131756 A | 12/2006 |
| MX | PA03007762 A | 3/2004 |
| MX | PA03006418 A | 4/2004 |
| WO | WO2004084130 A1 | 9/2004 |
| WO | 2005069229 A1 | 7/2005 |
| WO | WO2006003315 A1 | 1/2006 |
| WO | WO2006040472 A1 | 4/2006 |
| WO | WO2006053988 A1 | 5/2006 |
| WO | WO2007036642 A1 | 4/2007 |
| ZA | 200303026 A | 6/2003 |
| ZA | 200403503 A | 5/2005 |
| ZA | 200504256 A | 11/2006 |

* cited by examiner

MULTIFUNCTIONAL PAPER IDENTIFICATION LABEL

PRIORITY CLAIM

This application is a U.S. National Stage application of international application No. PCT/US2008/054651, filed Feb. 22, 2008 under the Patent Cooperation Treaty, which claims priority from U.S. Provisional Patent Application No. 60/903,107 filed Feb. 23, 2007.

TECHNICAL FIELD

The present invention relates to labels and tags, and in particular to paper-based identification labels for bar codes and radio frequency identification devices.

BACKGROUND ART

Electronic devices are commonly used for identification purposes for a host of different materials. Radio frequency identification devices ("RFID") can be used in the tracking and tracing of luggage, clothing, shipping boxes, identification cards, pet collars, files and the like, for "touch-free" tracking of goods. RFID devices are particularly beneficial because they are not limited to line of sight. They further do not rely on physical contact with the item being located. Retailers, distributors and manufacturers can scan their inventory remotely and in bulk. There is no need to handle each item individually or even have them in sight.

An RFID system has several components. A transponder is attached to the item being tracked. It can be secured to the item in the form of a tag or a label. The transponder comprises an antenna connected to a chip. The transponder chip is programmed with information about the item and contains a unique identifier that is associated with the item to be tracked. The information is transmitted by radio frequencies that are detectable by a reader having transmitting and receiving ability. When the receiver detects a signal from a transponder, it processes information regarding that transponder. A system of multiple computers, receivers and transponders can track large numbers of transponders over a large geographical region. For example, a mass marketer can track its inventory of items by size or color, automatically reordering particular items as the inventory is depleted.

However, the current generation of RFID tags is fairly expensive. Antennas are generally etched or printed onto a plastic substrate using copper, aluminum or conductive ink. The RFID chip that carries information is attached to the antenna. The antenna that is etched or printed on the plastic substrate with the embedded chip is then laminated with plastic and converted to an inlay. The inlay is then sent to a converter to be made into a pressure sensitive label by placing it between a face stock and a release liner. Creation of the inlay, followed by conversion of the inlay to a label requires many steps, adding to the cost. The etching of copper or aluminum is done only on plastic substrates, and is process intensive. Large-scale use of RFID technology requires a less expensive transponder label or tag for use in mass market quantities.

DISCLOSURE OF THE INVENTION

A first embodiment of the multifunctional label of the invention comprises a paper substrate formed from a cellulose furnish, the furnish including 1 to 2.5 percent of a wet strength resin, the percentage based on the dry fiber weight of the furnish. A first or front side of the substrate is machine glazed and is adapted for receiving print, such as a bar code or other identification indicia. An antenna receptive coating is applied to second or back side of the substrate. The antenna receptive coating comprises one or more pigments selected from the group of clay, magadite and mixtures thereof, a binder, and 1 to 2.5 parts by dry weight of pigment of a salt such as sodium chloride. A conductive ink antenna is printed or otherwise applied to the antenna receptive coating. A chip is secured to the antenna receptive coating and electrically connected to the antenna. Preferably, a protective layer such as a release liner is adhered onto the back side over the chip.

In an alternate embodiment, the protective layer is a second substrate which is adhered to the coated first substrate. Preferably the outer sides of both the first and second substrates are coated with a print receptive coating, such as an enamel coating. Either or both sides of the label can be printed with a bar code and/or other identification indicia, text and graphics.

A third embodiment is a RFID insert comprising a first paper substrate as described above having a machine glazed first side, and an antenna receptive coating on the back side of the first substrate. A conductive ink antenna applied to the antenna receptive coating, and a chip is connected to the antenna. As this embodiment functions merely as an insert, print receptive coatings are unnecessary.

A method of making a multifunctional label of the invention comprises the steps of forming a substrate from a cellulose furnish including 1 to 2.5 percent wet strength resin and a sizing agent, restraint drying a first or front side of the substrate with a Yankee cylinder, enamel coating the first side of the substrate with an print receptive coating, and coating the second or back side of the substrate with an antenna receptive coating. The antenna receptive back side coating comprises of one or more pigments selected from the group of clay, magadite and mixtures thereof, a binder, and 1 to 2.5 parts by dry weight of pigment of a salt. After the coated two side substrate is formed, the front side thereof is printed with a bar code or other identification indicia. Text or graphics may also be printed to the front side as may be desired. The back side is printed with a conductive ink antenna. After the antenna is printed a RFID chip is adhered onto the back side coating and electrically connected to the antenna. Finally a protective sheet such as release liner or second substrate is adhered to the back side over the chip.

MODES FOR CARRYING OUT THE INVENTION

Figure 1:
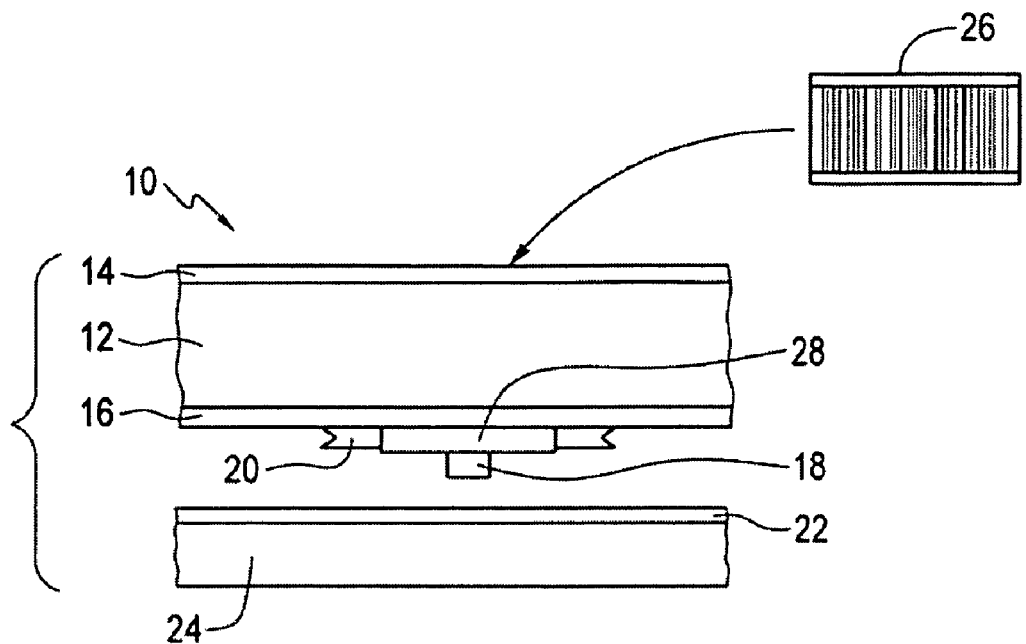
FIG. 1 is a edge view of a first embodiment of a multifunctional label of the invention.

The multifunctional paper identification label 10 of the invention is a combination label, bar code label and RFID tag. It includes a paper substrate 12 having a front side coating 14 and a back side coating 16, an RFID chip 18 and antenna 20 on the back side of the substrate, and an adhesive 22 and release liner 24 over at least portions of the backside. The front side coating 14 is receptive of a printed image, such as bar code, other indicia, and/or text and graphics as may be desired. The back side coating 16 is designed to accept an antenna 20 printed in a conductive ink on the coating. The coating is configured for improved adhesion and print quality of antenna images using specialized conductive inks.

The substrate 12 is a wet strength treated, moisture resistant, anti-wicking paper substrate. The substrate is made from a cellulose furnish that preferably is a mixture of softwood and hardwood Kraft, recycled paper, fillers and additives, and has an acidic pH. The preferred furnish comprises a mixture of about 50% bleached softwood Kraft, about 25% bleached hardwood Kraft and about 25% recycled broke (coated recycled paper) with a filler level of about 7-8% based on ashing method. Preferably, the furnish has a pH of about 4.5 to about 5.0. Control of the pH is effected by the amounts of wet strength additive, acid and alum added to the furnish.

The preferred furnish is modified by adding about 1.0% to about 2.5% by weight of dry fiber of a wet strength additive, such as melamine or urea resin. It is believed that the wet strength resin in combination with an acid pH improves the surface energy of the substrate and enhances the bonding properties of the conductive ink to the substrate. It is also believed to contribute to the folding endurance as measured by the increase in the number of folds achieved on a folding endurance tester. Addition of a wet strength additive also makes the paper substrate vary less with humidity and temperature based on a hygroexpansimeter and comparative tests with polyethylene ethylene terephthalate ("PET") prints. Suitable wet strength additives include Armes PR-335CU UF wet strength resin (Georgia Pacific Chemical Division, Eugene, Oreg.) and Cascomel AR-4 MF wet strength resin (Hexion Specialty Chemicals, Inc., Columbus, Ohio).

Addition of a sizing agent to the furnish improves water wicking resistance. At the same time the wet strength additive is added, a rosin size is preferably also added to the furnish in amounts of about 0.5% based on the weight of dry fiber of the furnish. The amount of size may vary from about 0.5% to about 0.75%. Preferred liquid sizing agents are Nuephor 645 emulsion sizing agent manufactured by Hercules Inc. (Wilmington, Del.), as well as alkyl ketene dimmer ("AKD") sizing agents, such as Hercon 70 from Hercules Inc.

The substrate is manufactured by conventional papermaking machines, such as a fourdrinier or top former. Paper substrate basis weights can range from about 30 lb/3000 ft$^2$ to about 55 lb/3000 ft$^2$. After the web is formed, the first or front side is machine glazed or restraint dried with a Yankee cylinder. In some cases, it is desirable to increase the bulk of the paper substrate to protect the RFID transceiver chip and to provide a smoother substrate to receive the antenna print.

The combined affects of a wet strength resin, rosin size and restraint drying from the Yankee cylinder provide dimensional stability under changing temperature and humidity conditions and physical handling.

The front side of the substrate is adapted to receive printing such as a bar codes, other indicia and/or text and graphics. Preferably the front side of the substrate is coated with a print receptive coating, such as an enamel coating, in conventional manner using any coating technique or equipment, e.g. a blade coater.

Print smoothness is achieved by using a back side coating 16 including one or more pigments, one or more binders and a salt. Optional coating additives are also included where it is desirable to alter the characteristics of the coating. Unless otherwise stated, all coating composition proportions described herein are in parts by weight of the specified component per 100 parts of the total pigment weight on a dry basis.

The pigment is chosen to provide a smooth surface on the coating. Preferred pigments are clay, magadite and mixtures thereof. Magadite is a platey synthetic nano-pigment. It can be substituted in whole or in part for the clay. A preferred clay is a #2 clay such as that produced by Englehard (Iselin, N.J.) or Imerys Clays (Roswell, Ga.). The preferred magadite is a sodium salt of silicic acid (The Dow Chemical Company, Midland, Mich.).

A preferred binder for the back side coating is starch in amounts of about 17 to about 35 parts per 100 parts pigment. Preferably, the starch is present in amounts of about 18 to about 32 parts and most preferably, about 29 parts starch per 100 parts pigment. A preferred starch binder is ethylated cornstarch Clineo 716 from Archer Daniel Midland Co (Decatur, Ill.). This starch is a superior film former.

An optional binder is a blend of protein and latex. Soy proteins are preferred, such as Procote 183-Z by Protein Technologies, Inc. (Tucson, Ariz.). The latex preferably has a high glass transition temperature, $T_g$, such as bimodal styrene butadiene latex or styrene butadiene latex (both from The Dow Chemical Company, Midland, Mich.). The $T_g$ of styrene butadiene is about −21° C. to about +28° C. Variation of $T_g$ varies the film-forming characteristics of the coating and therefore the porosity of the coated product. A preferred protein and latex binder blend comprises about 1-3 parts per 100 parts pigment protein plus about 17-22 parts latex per 100 parts pigment.

Various properties of the substrate are obtainable by varying the pigments and binders and the relative amounts of each. Combinations high in clay and starch tend to be high in porosity, while smoothness is enhanced the use of latex and nano-pigment. An inexpensive, medium porosity coating is made primarily of starch and clay.

Salt is added to the coating to reduce the surface resistivity of the base sheet and therefore to increase conductivity. This enhances the flow of current through the printed antenna and improves the RFID device read rate response when the device is interrogated by a reader. Any ionic salts that decrease the coating resistivity can be used, including alkali metal chlorides and fluorides. The preferred salt is sodium chloride. It is generally added in amounts ranging from about 0.1 parts to about 2.5 parts per 100 parts pigment, and preferably between about 1 to about 1.5 parts. More preferably, salt is added to the coating in amounts of about 1.5 parts per 100 parts pigment.

Other additives known in the art are added as desired to vary properties of the coating. If the coating is to be applied with a blade coater, a lubricant is optionally used to facilitate coating. A preferred lubricant is Berchem 4269, made by Berchem, Inc. (Cranston, R.I.). Another optional additive is a dispersant, such as Dispex N-40, an acrylic dispersant for inorganic minerals and made by Ciba Specialty Chemicals (Tarrytown, N.Y.).

The back side coating 16 is applied to the back side of the substrate to support an RFID antenna. Any coating device can be used for its application, including a blade coater, a rod coater, a curtain coater or other coating devices known to an artisan.

After the coated two side substrate is formed, the substrate is preferably hot soft calendered. The hot soft calender comprises at least one nip formed between a steel roll and a soft roll. The first or front side coating is on the soft roll side and the second or back side coating is on the steel side of the nip. The steel roll provides smoothness for the RFID antenna. The soft roll on the front side minimizes gloss to the front side, as a matte finish is preferred for bar code applications.

An RFID antenna 20 for the transceiver is printed on or otherwise applied to the coating with a conductive ink. Preferred inks include a conductive silver-flake ink provided by Precisia, Inc. (Ann Arbor, Mich.) and PARMOD® silver inks (Parelec Inc., Rocky Hill, N.J.). These inks comprise mixtures of metal particles in a reactive organic medium that includes metallo-organic compounds. The PARMOD® inks and pastes chemically react upon exposure to elevated temperatures to produce highly conductive circuit traces. The antenna is preferably applied to the back side coating by screen printing, flexo or rotogravure press. Conductive inks are cured by through intensive drying at high temperature. The dimensionally stable coated paper substrate described above is able to withstand such intensive drying at high temperatures with minimal shrinkage, and thus maintains the specifications for the printed antenna.

The RFID transceiver chip 18 is secured to the back side coating of the substrate and connected to the printed antenna 20 using an adhesive 28. The adhesive is a non-conductive paste or an anisotropic conductive paste adhesive. Any Generation 2 chips are useful, particularly Impinj Gent chips (Impinj, Inc., Seattle, Wash.) and similar chips made by Texas Instruments (TI-Rfid chips, Texas Instruments Incorporated, Dallas, Tex.) or Phillips or strap attachments from Alien Technology (Morgan Hill, Calif.) or Texas Instruments (Dallas, Tex.). Both high frequency (13.56 Mhz) and ultra-high frequency (855-950 Mhz) operation using known antenna and chip designs perform well on these substrates.

After the transceiver chip 18 is connected to the antenna 20 and fixed in place, the back side of the substrate paper, including the transceiver chip and antenna, is laminated to a release liner 24 with an adhesive 22 such as a pressure sensitive adhesive or a hot melt adhesive that is transfer coated. The adhesive can be applied to the back side of the substrate, then the release liner is secured into the adhesive. Alternatively, and preferably a pressure sensitive adhesive is applied to the release liner, and the release liner and pressure sensitive adhesive are secured to the substrate together, as illustrated in FIG. 1. Labels are then cut from the substrate that are ready to apply to a product when the release liner is removed. Direct preparation of a label eliminates the need to prepare an inlay, then transform it into a label.

Figure 2:
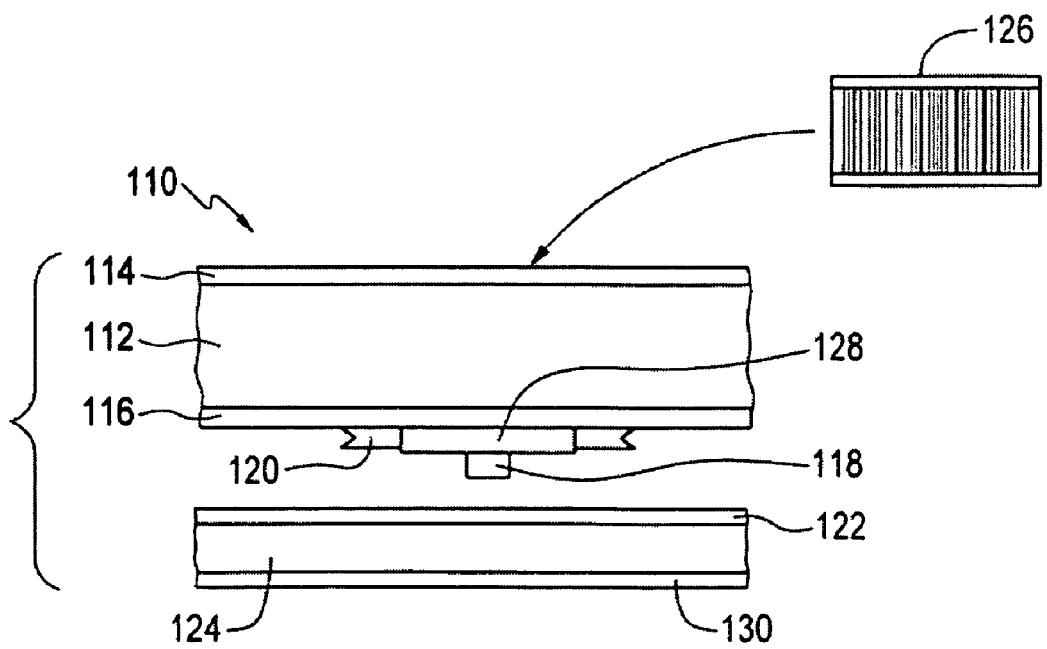
FIG. 2 is a edge view of a second embodiment of a multifunctional label of the invention.

In a second embodiment, the multifunctional identification label can be made into a transit ticket 110 as shown in FIG. 2. The reference numerals in FIG. 2 correspond to the same items as shown and described in reference to FIG. 1, but in the 100 number sequence, except as noted below. Instead of securing an adhesive 22 and release liner 24 to the coated substrate 12, as shown in FIG. 1, a second paper substrate 124 is adhered to the backside of the coated paper substrate 112. Any suitable glue or adhesive 122 is applied to the inner side of the second paper substrate 124, then pressed together with the first substrate 112 sandwiching the chip 118 and antenna 120 there between. One or both substrates 112, 124 may be provided with print receptive coatings 114 and 130 to receive print images, such as text, graphics, a bar code, or other indicia as desired.

Figure 3:
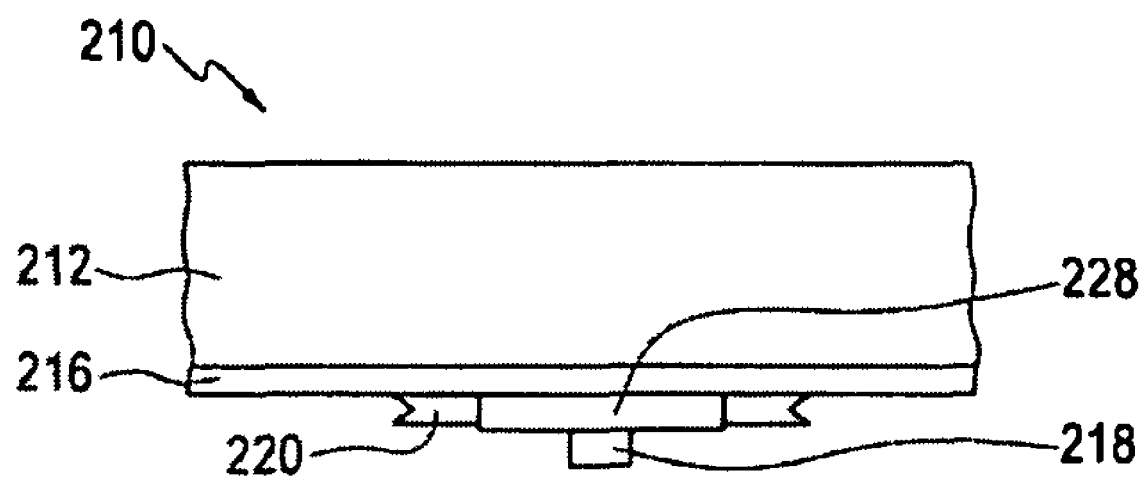
FIG. 3 is a edge view of a third embodiment of a RFID insert of the invention.

A third embodiment of the invention, comprising an RFID insert 210 is shown in FIG. 3. The reference numerals in FIG. 3 correspond to the same items as shown and described in reference to FIGS. 1 and 2, but in the 200 number sequence. The insert 210 does not require print receptive coatings, except for the antenna receptive back side coating 216. The insert 210 may be used in place of a conventional plastic inlay by simply inserting it in between a face stock and a release liner. The advantage of the insert 210 of the invention is that is less expensive than conventional plastic inlays and is recyclable.

The RFID device is made by preparing the base substrate 12, 112, 212 and machine glazing a first side. Thereafter, the back side coating 16, 116, 216 coating is applied, and an optional front side 14, 114 coating is applied. The formation of the paper substrate can be made on a conventional paper machine with a Yankee cylinder. The front and back side coatings can be applied with conventional coating machinery on or off the paper machine. At this point, the label stock is in web form on paper roll. The web may be converted as necessary or desirable for printing. The front side of the label stock is optionally printed with a bar code 26, 126 and/or other graphics as may be desired. The antenna 20, 120, 220 is printed on the backside coating 16, 116, 216 and cured. Next, the chip 18, 118, 218 is attached with adhesive 28, 128, 228. Thereafter, a pressure sensitive adhesive 22 and release liner 24 are optionally applied to the back side of the coated substrate. The release liner covers and protects the chip. The adhesive is either applied to the substrate or to the release liner. In the latter case, the adhesive and release liner are applied to the substrate together. Alternatively, in accordance with the second embodiment, a second substrate 124 is adhered to the coated substrate 112 in lieu of a release liner. Finally, the label 10, 110, 210 is cut to the desired size.

Example 1

A base sheet was made from the furnish described in Table I.

TABLE I

| Component | Concentration in Furnish |
|---|---|
| Hardwood | 25% based on dry fiber weight |
| Softwood | 50% based on dry fiber weight |
| Broke/Recycled | 25% based on dry fiber weight |
| Size | 0.5% based on dry fiber weight |
| Starch | 1% based on dry fiber weight |
| Wet Strength Resin | 1% based on dry fiber weight |

A base coating was prepared for use as the back side coating. The amounts of each component are shown in Table II below.

TABLE II

| Component | Base Coating, parts per 100 parts pigment |
|---|---|
| Dispex N-40 Dispersant | 0.2 |
| #2 Clay | 100 |
| Clineo 716 Starch | 32 |

Sodium chloride was added to the base coating at concentrations shown in Table III below.

TABLE III

| NaCl Addition | Backside Surface Resistivity, $\Omega$/sq. | Front Surface Resistivity, $\Omega$/sq. | Volume Resistivity, $\Omega$-cm |
|---|---|---|---|
| 0 | 3.44E+11 | 3.25E+11 | 1.04E+11 |
| 0.1 | 3.49E+11 | 3.42E+11 | 1.05E+11 |
| 0.2 | 5.06E+11 | 3.16E+11 | 1.25E+11 |
| 0.25 | 2.59E+11 | 2.27E+11 | 1.55E+11 |
| 0.5 | 1.95E+11 | 1.86E+11 | 1.03E+11 |
| 1 | 1.17E+11 | 1.31E+11 | 4.33E+10 |
| 1.5 | 8.45E+10 | 7.46E+10 | 5.92E+10 |
| 2.5 | 5.25E+10 | 5.84E+10 | 5.77E+10 |

As can be seen from Table III above, dramatic decreases in surface resistivity and volume resistivity are found when the sodium chloride addition exceeds 1 part per 100 parts pigment on a weight basis. There is no significant improvement when the sodium chloride increases over 1.5 parts.

Example 2

An alternate base coating was prepared for use as the back side coating on the substrate of Example 1. The amounts of each component are shown in Table IV below.

TABLE IV

| Component | Base Coating, parts per 100 parts pigment |
|---|---|
| Dispex N-40 Dispersant | 0.25 |
| Magadite Nano Pigment | 100 |
| Procote 183-Z Protein | 3 |
| 31060.5 Latex | 22 |
| Berchem 4269 Lubricant | 2 |

Sodium chloride was added to the base coating at varying amounts, and a similar drop in resistivity as describe above in reference to Table III was measured. As compared to the Example 1 clay coating, the coating of Example 2 provided improved smoothness and reduced porosity. The coated substrate was subsequently printed with conductive ink and good ink adhesion was obtained.

Example 3

Multifunctional identification labels made according to this invention were compared to conventional RFID tags prepared on a polyethylene ethylene terephthalate ("PET") substrate. The PET tags were manufactured using a conventional RFID conversion process using similar conductive ink printing methods for antenna printing, chip attaching and label converting process. Approximately 5000 tags of each type were tested and the failure rates measured.

The overall failure rate of the paper-based RFID devices of the present invention was 7.91%, while the failure rate for the conventional PET devices was almost twice as much at 15.34%. This demonstrates the operability and quality of the RFID devices on the coated paper substrate of the invention.

Example 4

Additional samples of the paper substrate of Example 1 were prepared. The base coating of Example 1 was prepared and the additives were each added to a portion of the base coating. Three samples of the coated paper substrate were treated as shown in Table V below.

TABLE V

| Sample | Substrate Treatment | Parker Print Surf - 5 KG (microns) | Fold Endurance (MD) | Fold Endurance (CD) |
|---|---|---|---|---|
| 07025 | 1% melamine or Urea Formaldehyde | 6.12 | 574 | 744 |
| 07026 | 1% melamine or Urea Formaldehyde + 1.5% NaCl | 6.13 | 493 | 619 |
| 07027 | No treatment | 6.04 | 225 | 202 |

The above data demonstrate the improved durability and foldability of the substrate with and without the additives to the paper substrate.

Persons skilled in the art will appreciate that suitable alternatives and equivalents are available. Pigments and dyes may be optionally added to provide brightness and opacity properties for some applications. The front side of the substrate may be optionally calendered or hot soft calendared to improve the printing surface and to enhance gloss properties where the thermal transfer printing is not desired.

Although particular material suppliers have been identified, they are exemplary only and that alternative suppliers may be used. Further, unless a particular material is indicated as being critical, equivalent substitute materials could be used to perform substantially the same function. The concentration ranges are based on currently available data, and minor alterations thereof may be made without departing from the scope of the claimed invention.

While particular embodiments of the multifunctional identification label of the invention have been shown and described, it will be appreciated by those skilled in the art that changes and modifications may be made thereto with departing from the scope of the appended claims.

What is claimed is:

1. A label comprising:
   a first paper substrate formed from a cellulose furnish, said cellulose furnish including 1 to 2.5 percent wet strength resin, the percentage being based on a dry fiber weight of the cellulose furnish, a first side of said first substrate being machine glazed;
   an antenna receptive coating on a second side of said first substrate, said antenna receptive coating comprising one or more pigments selected from the group of clay, magadite and mixtures thereof, a binder, and 1 to 2.5 parts by dry weight of pigment of a salt;
   a conductive ink antenna on said antenna receptive coating; and
   a chip secured to said antenna receptive coating and electrically connected to said conductive ink antenna.

2. The label as in claim 1 further comprising a print receptive coating on the first side of said first substrate; and a bar code printed on said first side coating.

3. The label as in claim 1 further comprising a pressure sensitive adhesive on said antenna receptive coating and a release liner over said pressure sensitive adhesive.

4. The label as in claim 1 further comprising a second paper substrate adhered to said antenna receptive coating, said chip being sandwiched between said first and second substrates.

5. The label as in claim 4 further comprising a first print receptive coating on the first side of said first substrate, and a second print receptive coating on an outer side of said second substrate.

6. The label as in claim 1, wherein said antenna receptive coating pigments are substantially 100 percent magadite nano-pigment.

7. A label comprising:
   a paper substrate formed from a cellulose furnish, said cellulose furnish including 1 to 2.5 percent of a wet strength resin and about 0.5 percent sizing agent, the percentages being based on a dry fiber weight of the cellulose furnish, and a first side of said substrate being machine glazed;
   a first print receptive coating on the first side of said substrate;
   a bar code printed on the first side coating;
   an antenna receptive coating on a second side of said substrate, said antenna receptive coating comprising one or more pigments including magadite nano-pigment, a binder, and 1 to 2.5 parts by dry weight of pigment of a salt;
   a conductive ink antenna printed on said antenna receptive coating;

a chip secured to said antenna receptive coating and electrically connected to said conductive ink antenna; and a protective sheet adhered over said chip.

8. The label as in claim 7 wherein said binder of said antenna receptive coating comprises 17 to 35 parts by dry weight of pigment of a starch.

9. The label as in claim 7 wherein said protective sheet comprises a release liner which is adhered to said paper substrate with a pressure sensitive adhesive.

10. The label as in claim 7 wherein said protective sheet comprises a paper sheet adhered at least in part to said antenna receptive coating.

11. The label as in claim 10 further comprising a second print receptive coating on an outer surface of said paper sheet.

12. A method of making a multifunctional label, comprising the steps of forming a substrate from a cellulose furnish including 1 to 2.5 percent wet strength resin and a sizing agent, the percentage being based on a dry fiber weight of the cellulose furnish;

restraint drying a first side of the substrate with a Yankee cylinder;

coating the first side of the substrate with a print receptive coating;

coating a second side of the substrate with coating comprised of one or more pigments selected from the group of clay, magadite and mixtures thereof, a binder, and 1 to 2.5 parts by dry weight of pigment of a salt;

printing the first side coating of the substrate with a bar code;

printing a conductive ink antenna onto the second side coating;

adhering a chip onto the second side coating and electrically connecting the chip to the conductive ink antenna; and adhering a protective sheet to the second side coating over the chip.

13. The method as in claim 12 further comprising the step of hot soft calendering the coated two side substrate after the coating steps and before the printing steps, the hot soft calender having at least one nip formed between a steel roll and a soft roll, the first side coating being on the soft roll side and the second side coating being on the steel side of the nip.

14. A label comprising:

a paper substrate formed from a cellulose furnish, said cellulose furnish including 1 to 2.5 percent of a wet strength resin and about 0.5 percent sizing agent, the percentages being based on a dry fiber weight of the cellulose furnish, and a first side of said paper substrate being machine glazed;

a print receptive coating on the first side of said paper substrate;

an antenna receptive coating on a second side of said paper substrate, said antenna receptive coating comprising magadite nano-pigment, a latex binder, and 1 to 2.5 parts by dry weight of pigment of a salt;

a conductive ink antenna printed on said antenna receptive coating;

a chip secured to said antenna receptive coating and electrically connected to said conductive ink antenna; and a protective sheet adhered over said chip.

15. The label as in claim 14, wherein said magadite nano-pigment is substantially the only pigment in said antenna receptive coating.

* * * * *